(12) United States Patent
Astolfi et al.

(10) Patent No.: US 8,060,346 B2
(45) Date of Patent: Nov. 15, 2011

(54) THIN CLIENT GRAPHICAL PRESENTATION AND MANIPULATION APPLICATION

(75) Inventors: Anthony Paul Astolfi, Boxborough, MA (US); Peter Hartwell Webb, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 1131 days.

(21) Appl. No.: 11/837,316

(22) Filed: Aug. 10, 2007

(65) Prior Publication Data

US 2008/0229234 A1 Sep. 18, 2008

Related U.S. Application Data

(63) Continuation of application No. 11/687,390, filed on Mar. 16, 2007.

(51) Int. Cl.
*G06F 17/50* (2006.01)
(52) U.S. Cl. .............................................. 703/1; 706/21
(58) Field of Classification Search .................. 703/6, 7, 703/1, 2; 345/419, 848; 379/201.06; 709/203; 706/20; 382/154, 128; 434/365; 705/26; 358/1.9
See application file for complete search history.

(56) References Cited

U.S. PATENT DOCUMENTS

| | | | | |
|---|---|---|---|---|
| 6,437,778 | B1* | 8/2002 | Matsui et al. .................. | 345/419 |
| 2001/0047250 | A1* | 11/2001 | Schuller et al. .................... | 703/1 |
| 2002/0085219 | A1* | 7/2002 | Ramamoorthy ............... | 358/1.9 |
| 2004/0075697 | A1* | 4/2004 | Maudlin ........................ | 345/848 |
| 2006/0188143 | A1* | 8/2006 | Strassenburg-Kleciak ... | 382/154 |
| 2006/0206562 | A1* | 9/2006 | Callegari ....................... | 709/203 |
| 2006/0284867 | A1* | 12/2006 | Ishikawa et al. .............. | 345/419 |
| 2007/0014452 | A1* | 1/2007 | Suresh et al. ................. | 382/128 |
| 2007/0071209 | A1* | 3/2007 | Horvitz et al. ........... | 379/201.06 |
| 2007/0130020 | A1* | 6/2007 | Paolini ............................ | 705/26 |
| 2007/0238085 | A1* | 10/2007 | Colvin et al. ................. | 434/365 |
| 2007/0239637 | A1* | 10/2007 | Paek et al. ........................ | 706/20 |

OTHER PUBLICATIONS

A. Astolfi et al., co-pending U.S. Appl. No. 11/687,390, filed Mar. 16, 2007, "Thin Client Graphical Presentation and Manipulation Application".

\* cited by examiner

*Primary Examiner* — Kandasamy Thangavelu
(74) *Attorney, Agent, or Firm* — Harrity & Harrity, LLP

(57) ABSTRACT

A distributed graphical presentation and manipulation application executes as a thin client application in a network. The networked graphical presentation and manipulation application can generally be used without requiring a user to install any specific software prior to using the application. In one aspect, code may be received from a server, and a local environment may be generated based on the code, where the local environment may be configured to display a view of the graphical model. One or more model views to be requested may be predicted, and the predicted views may be stored in a memory for display in the local environment.

21 Claims, 12 Drawing Sheets

2

THIN CLIENT GRAPHICAL PRESENTATION AND MANIPULATION APPLICATION

CROSS-REFERENCE TO RELATED APPLICATION

This application is a continuation of U.S. patent Ser. No. 11/687,390, entitled "THIN CLIENT GRAPHICAL PRESENTATION AND MANIPULATION APPLICATION", filed Mar. 16, 2007, the entire content of which is incorporated by reference herein.

BACKGROUND

Graphical presentation and manipulation applications, such as, for example, three-dimensional modeling applications, are typically provided as stand-alone applications that use significant computational resources on the stand alone device to generate and render three-dimensional models for presentation and spatial manipulation by users. Unfortunately, usability of conventional modeling applications is limited to an installed user base. Moreover, providing network or remote access to model data for use in a modeling application may require significant network bandwidth and may result in significant operational latency.

SUMMARY

One aspect is directed to a computing device-implemented method. The method may include receiving code from a server, and generating a local environment based on the code, where the local environment may be configured to display a view of the graphical model. The method may also include predicting one or more model views likely to be requested, and storing the predicted views in a memory for display in the local environment.

Another aspect is directed to a computer-readable medium that stores instructions executable by at least one processor. The computer-readable medium may include one or more instructions for generating a local environment in a client engine, wherein the local environment may be configured to display a two dimensional view of a graphical model; one or more instructions for predicting model views likely to be requested; one or more instructions for storing the predicted views in a memory for display in the local environment; one or more instructions for receiving a request to display a manipulated view; one or more instructions for determining whether the requested view has been previously stored as a predicted view; one or more instructions for retrieving from the memory the predicted view that matches the requested view; and one or more instructions for displaying the predicted view matching the requested view in the local environment.

Yet another aspect is directed to a system including client logic executing within a browser program of a client computing device. The client logic may include a user interface component to handle displaying of model views on the client computing device and a client engine component to locally handle requests from a user to manipulate spatial positioning of the model view on the client computing device, where the client logic may be configured to predict model views likely to be requested based on one of historical model view requests, or stored input device movement mappings. The system may also include server logic configured to distribute the client engine to the client computing device when requested through the browser program of the client computing device. The server logic may include a back-end server component configured to extract requested two-dimensional views from corresponding three-dimensional models, and a front-end server component configured to provide a web interface to the client computing device and forward the extracted views to the client computing device. The server logic may be further configured to receive requests from the client logic for model views corresponding to the predicted model views, extract the requested model views, and transmit the requested model views to the client logic.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description refers to the accompanying drawings. The detailed description does not limit the invention.

Overview

Exemplary embodiments described herein relate to a highly efficient and user-friendly client/server-based graphical manipulation application or module. More specifically, in one embodiment, the client/server-based graphical manipulation software may include a three-dimensional (3D) modeling or visualization application. The client/server graphical manipulation application may provide many or all of the features provided by a standard graphical manipulation application. The 3D visualization application may provide for efficient distribution and access to a number of users, without requiring specialized software tools or applications. Further, users may access the 3D visualization application from a variety of potentially remote locations.

Exemplary System Architecture

Figure 1:
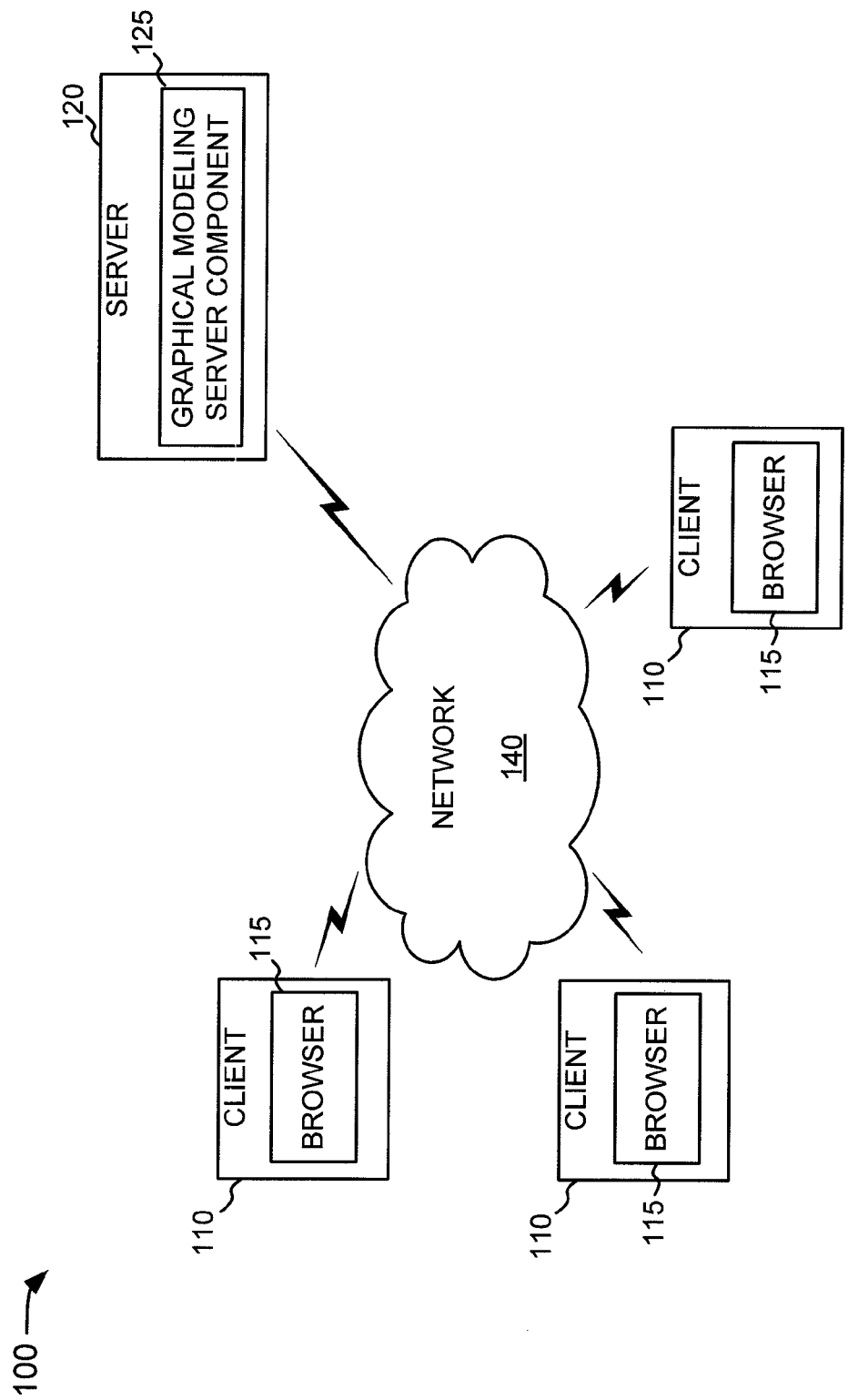
FIG. 1 is a diagram of an exemplary system in which concepts consistent with the exemplary embodiments described herein may be implemented.

FIG. 1 is a diagram of an exemplary system 100 in which concepts consistent with the exemplary embodiments described herein may be implemented. System 100 may include multiple client entities 110 that can connect to servers, such as server 120, via a network 140. Network 140 may include a local area network (LAN), a wide area network (WAN), a telephone network, such as the Public Switched Telephone Network (PSTN), an intranet, the Internet, or a combination of networks. Three client entities 110 and one server 120 are illustrated as connected to network 140 for simplicity. In practice, there may be more client entities and/or servers. Also, in some instances, a client may perform one or more functions of a server and a server may perform one or more functions of a client.

A client entity 110 may include an entity, such as a personal computer, a laptop or notebook computer, a mobile or cellular telephone, a personal digital assistant (PDA), or another type of computation or communication device. Users of client entities 110 may access or receive information from server 120. Client entities 110 may connect to network 140 via wired or wireless connections.

Server 120 may include one or more server entities that may generally interact with client entities 110 such that client entities 110, in conjunction with server 120, execute a graphical presentation and manipulation application. In one embodiment, the graphical presentation and manipulation application may operate in conjunction with another application, such as a web browser application. Server 120 may include a graphical modeling server component 125 to facilitate operation of the graphical presentation and manipulation application.

As will be described in detail below, server 120 may include components configured to generate and render 3D models or visualizations. Each model may, in turn, be represented by numerous two-dimensional (2D) views, depending on a desired viewing angle, zoom level, and displayed content.

In accordance with embodiments described herein, 3D models or visualizations and their corresponding 2D views as generated or rendered by server 120 may be based on various types of data and information. For example, the 3D models may be based on data such as engineering data, medical data, scientific data, weather data, mathematical data, and data from other disciplines. More specifically, the models may correspond to a variety of different types of data or events, including (but not limited to) physical objects or structures, fluid flow, biological systems, weather patterns, seismic events, multi-body interactions, chemical processes, outputs from systems or devices (e.g., power curves for an engine), numerical algorithms, signal processing data, etc.

In accordance with embodiments described herein server 120 may transmit the 2D views to client entities 110 in response to user requests received at client entities 110. The transmitted views may be cached or otherwise stored by client entities 110. Additionally, server 120 may transmit software or instructions to client entities 110 to assist in enhancing a user experience for the graphical presentation and manipulation application. Although illustrated as a single device in FIG. 1, server 120 may be implemented as, for example, a single computing device or as multiple distributed computing devices. The relationship of client entity and server arises by virtue of computer programs running on the respective computers and having a client-server relationship to each other. One will recognize that a device's role as either a client entity or a server device may depend on the specific application being implemented. In one exemplary embodiment, client entity 110 may access server 120 as part of a managed service that may be offered on a subscription basis.

As mentioned above, the interaction of client entities 110 with server 120 may be accomplished through a browser program 115 or a similar application being executed at client entities 110. For example, the graphical presentation and manipulation application may be a web application that runs within browsers 115. In this manner, client entities 110 may not be required to install any graphical presentation and manipulation specific software (e.g., a dedicated data viewing application) to view and manipulate a graphical, e.g., 3D image at client entity 110. Browser programs are well known and are widely available in the art. When browsers or browser programs are discussed herein, these terms are intended to refer to any program that allows a user to browse markup documents (e.g., web documents), regardless of whether the browser program is a stand alone program or an embedded program, such as a browser program included as part of an operating system.

Exemplary Computing Device Architecture

Figure 2:
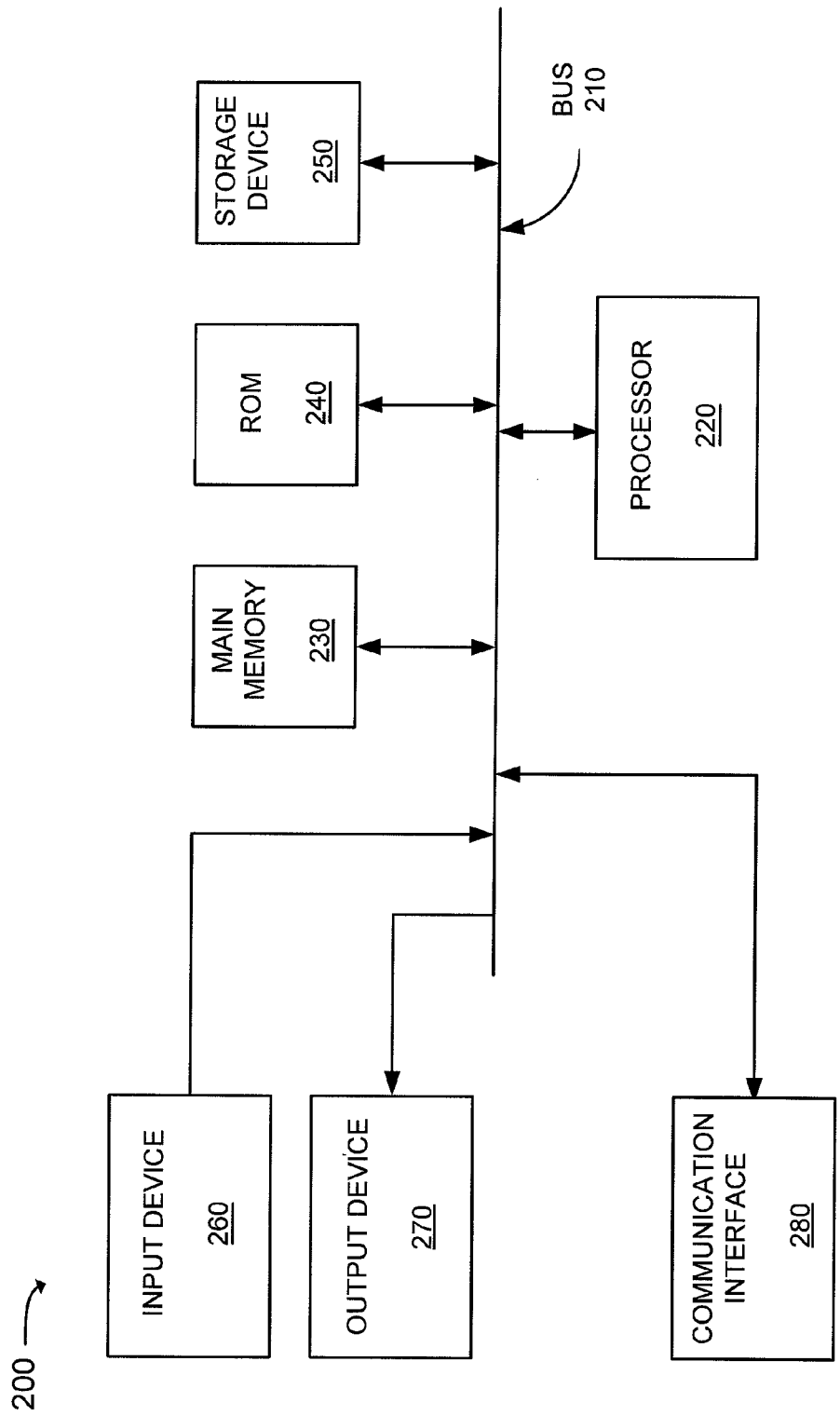
FIG. 2 is an exemplary diagram of a computing device illustrated in FIG. 1.

FIG. 2 is an exemplary diagram of a computing device 200, which may correspond to one of client entities 110 or server 120. Computing device 200 may include a bus 210, a processor 220, a main memory 230, a read only memory (ROM) 240, a storage device 250, an input device 260, an output device 270, and a communication interface 280. Bus 210 may include a path that permits communication among the components of computing device 200.

Processor 220 may include any type of processor, microprocessor, or processing logic that interprets and executes instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits a user to input information to computing device 200, such as a keyboard, a mouse, a trackball, a track pad, a touch sensitive display, a pen, voice recognition and/or biometric mechanisms, an accelerometer or gyroscope-based motion input device, a camera, etc. Output device 270 may include a mechanism that outputs information to the user, including a display, a printer, a speaker, etc. Communication interface 280 may include any transceiver-like mechanism that enables computing device 200 to communicate with other devices and/or systems. For example, communication interface 280 may include mechanisms for communicating with another device or system via a network, such as network 140.

Graphical modeling server component 125 may be implemented in software and stored in a computer-readable medium accessible to server 120, such as memory 230. Similarly, browser 115 may be implemented in a computer-readable medium accessible to client entity 110. A computer-readable medium may be defined as one or more physical or logical memory devices and/or carrier waves.

The software instructions defining graphical modeling server component 125 may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with exemplary embodiments described herein. Thus, the embodiments described herein are not limited to any specific combination of hardware circuitry and software.

Graphical Presentation and Manipulation Application Architecture

A graphical presentation and manipulation application, as described herein, may be implemented as a distributed web application in which portions of the application execute at one or more of client entities 110 and at server 120. More specifically, client entities 110 that wish to use the graphical presentation and manipulation application may request the graphical presentation and manipulation application from server 120. In response, server 120 may transmit portions of the graphical presentation and manipulation application for local execution at client entities 110. The graphical presentation and manipulation application may thus execute as a distributed application across server 120 and one or more of client entities 110.

Figure 3:
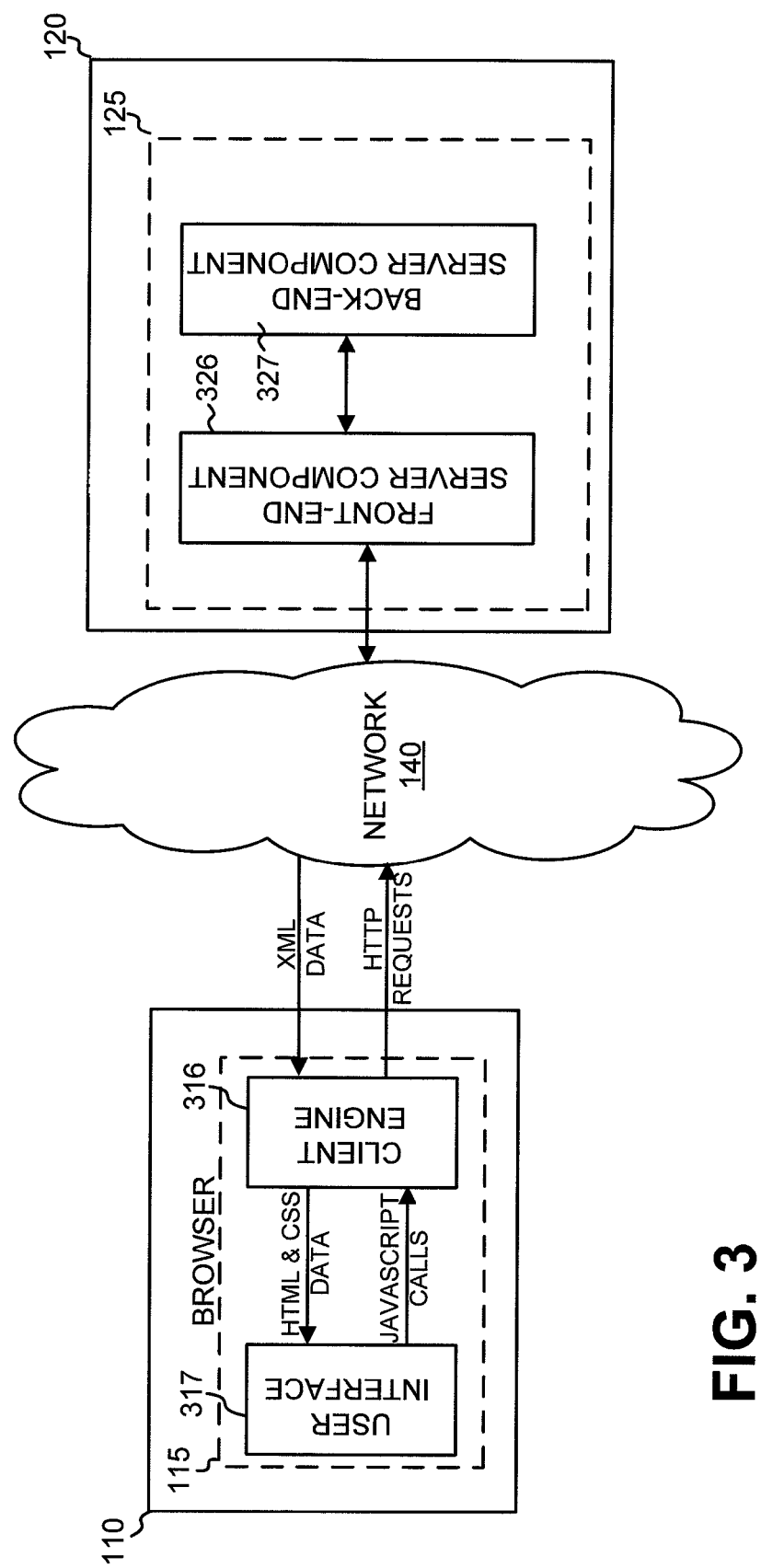
FIG. 3 is a diagram illustrating an exemplary embodiment of a graphical presentation and manipulation application.
Figure 4A:
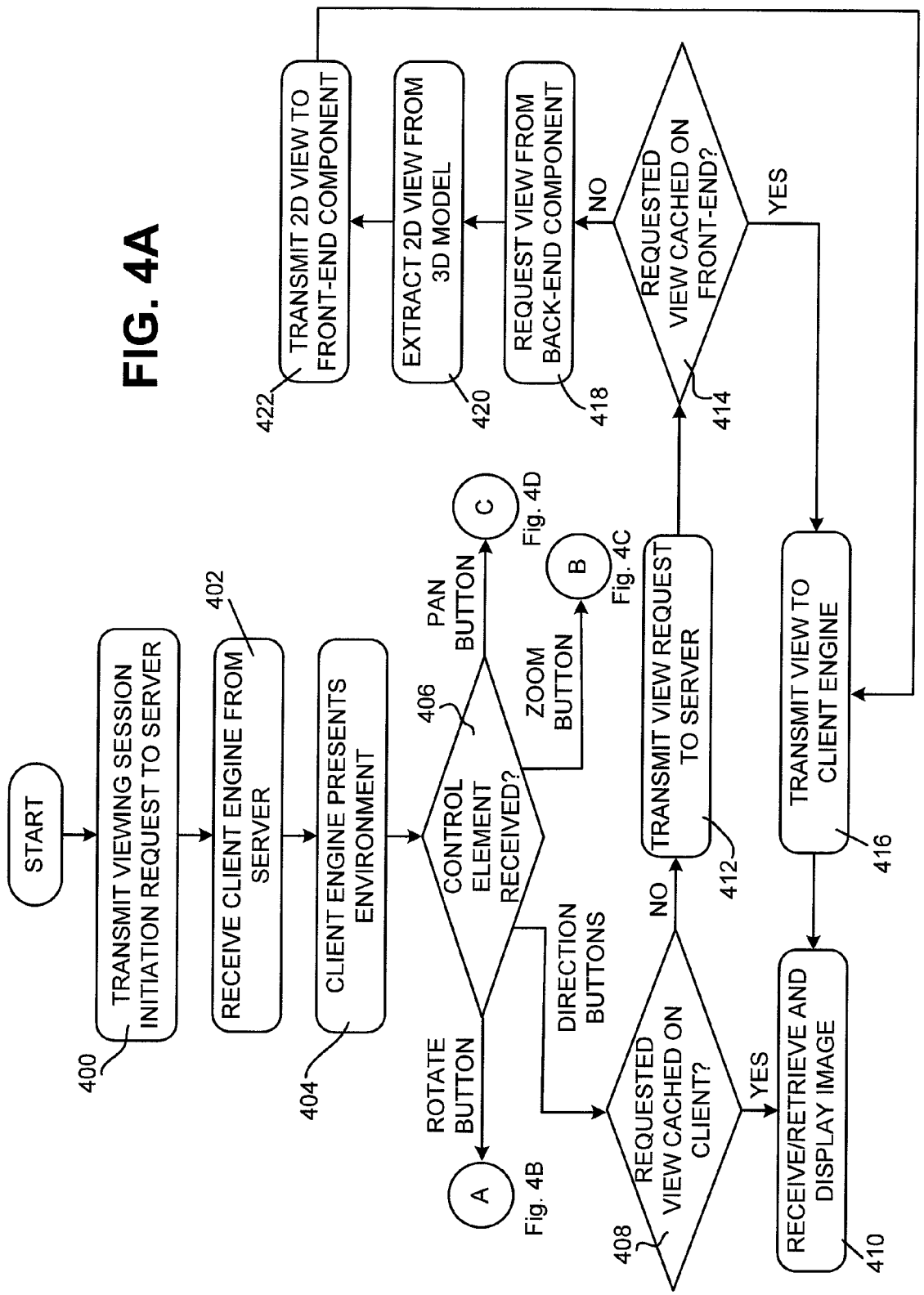
FIGS. 4A-4D are flow charts illustrating exemplary operations of the various components of the graphical presentation and manipulation.
Figure 4B:
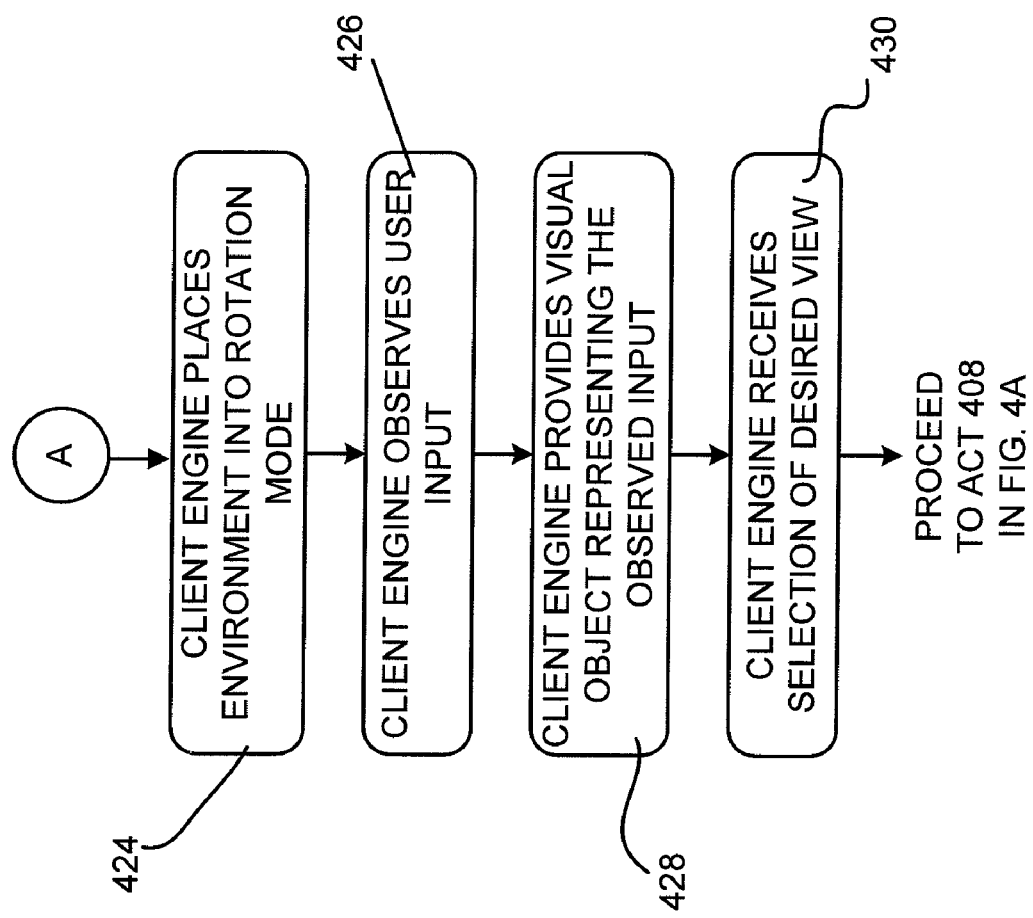
Figure 4C:
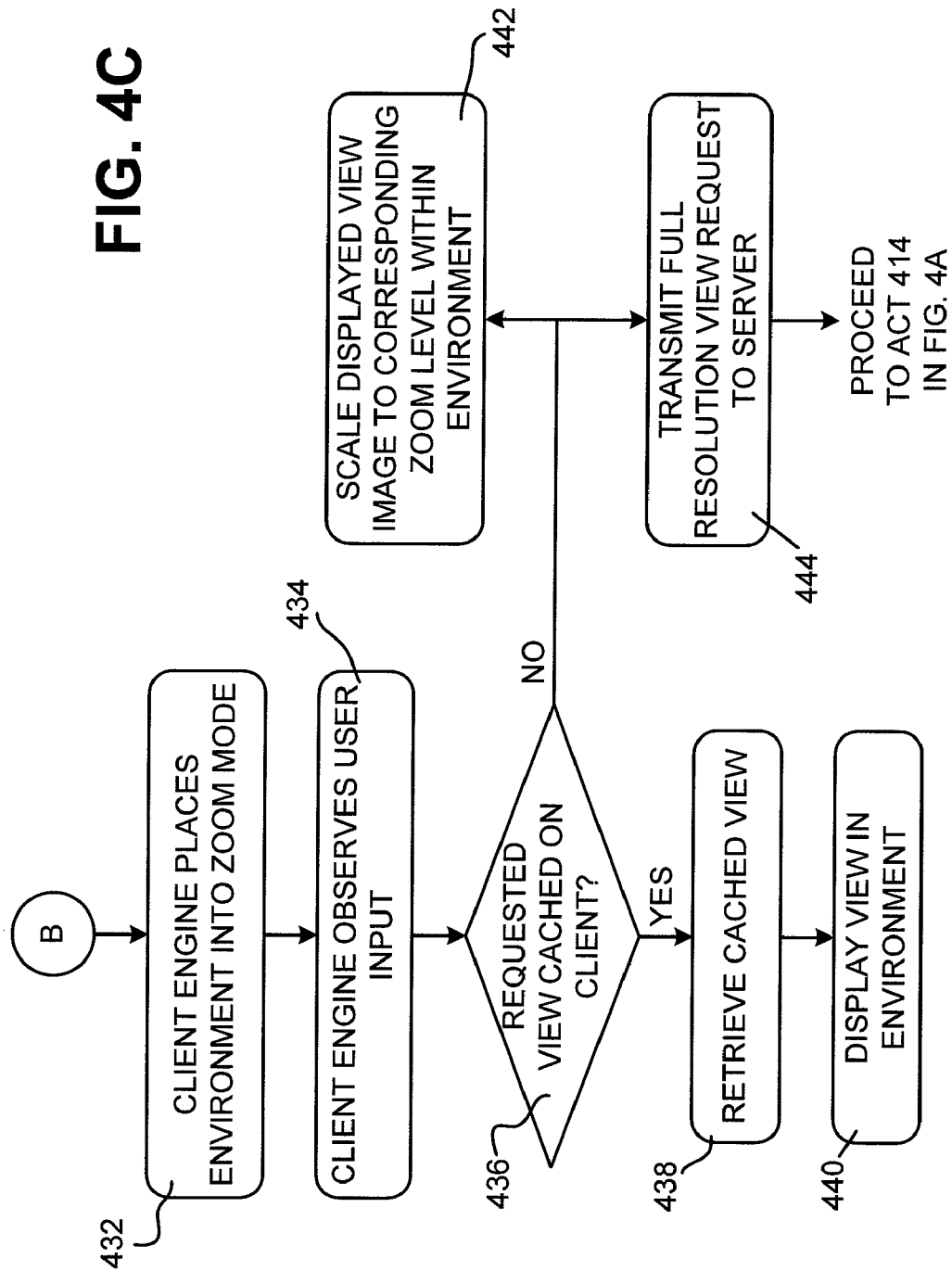
Figure 4D:
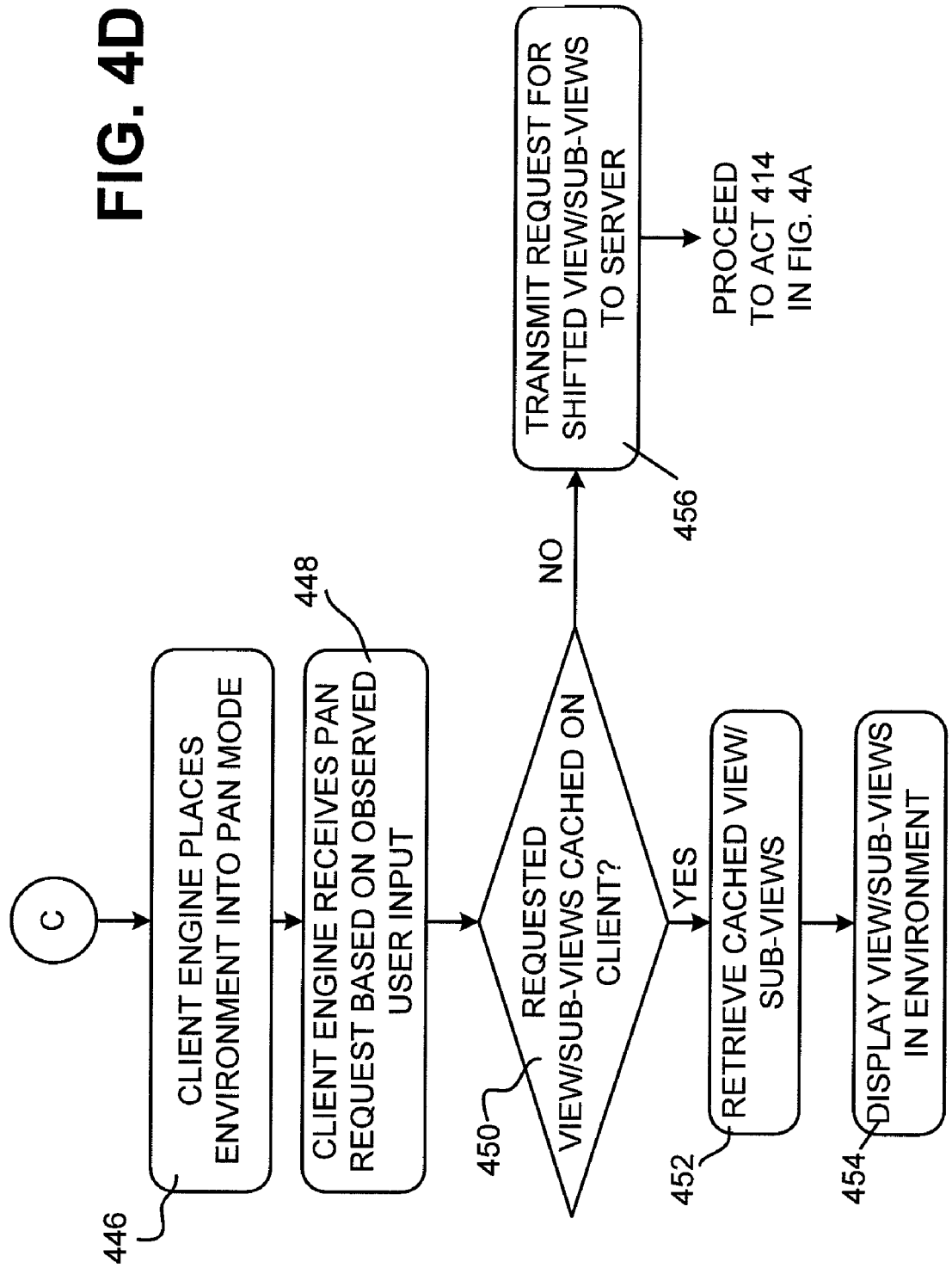

FIG. 3 is a diagram, similar to FIG. 1, and illustrating an exemplary embodiment of the graphical presentation and manipulation application in additional detail. Graphical modeling server component 125 may include a front-end component 326 and a back-end component 327. Front-end component 326 may include a web and/or XML server that interfaces with client entities 110. For example, front-end component 326 may receive requests from client entities 110 and transmit data to client entities 110 in response thereto. Back-end component 327 may perform the more substantive processing related to the graphical presentation and manipulation application, such as the calculation of functions to manipulate, modify, and generate a graphical image, such as a 3D model. As will be described in additional detail below, front-end component 326 may operate to extract two-dimensional views of a three-dimensional image or model created and/or generated by back-end component 327 based on a received user request. The extracted views may be transmitted to client entities 110 for potential display to a user.

Portions of the graphical presentation and manipulation application may also execute within client entities 110. For example, within browser 115, graphical presentation and manipulation application may be conceptualized as including a client engine 316 and a user interface 317. Client engine 316 may be implemented using, for example, JavaScript that is downloaded from server 120 when needed by client entity 110. User interface 317 may provide the user interface that is displayed in browser 115 based on, for example, HTML (hyper-text markup language) and CSS (cascading style sheets) data supplied from client engine 316.

User interface 317 and client engine 316 together act to improve speed and performance of traditional browser-based web applications. In one embodiment, client engine 316 may add a client-side layer that can handle many of the user interactions with user interface 317. Instead of loading a web page at the start of a user session, browser 115 may load client engine 316 from server 120 (or, alternatively, from a local cache). Client engine 316 may then be responsible for rendering the interface the user sees, performing calculations or other processing based on user information and interactions, and communicating with server 120 on the user's behalf. Client engine 316 may allow the user's interaction with the graphical presentation and manipulation application to happen asynchronously, i.e., independent of communication with server 120.

In one embodiment, the client-side operation of the graphical presentation and manipulation application may be implemented using known Asynchronous JavaScript and XML (AJAX) web development techniques, although other technologies could be used.

Although FIG. 3 shows an exemplary modeling server component 125 and client entity 110, in other embodiments, modeling server component 125 and client entity 110 may include fewer, different, or additional components than depicted in FIG. 3. Moreover, one or more components of modeling server component 125 and client entity 110 may perform one or more functions of one or more other components of graphical presentation and manipulation application architecture.

Exemplary Processes

FIGS. 4A-4D are flow charts illustrating exemplary operations of the various components of the graphical presentation and manipulation application in an exemplary user session. Processing may begin with a user at one of client entities 110 initiating an image viewing or manipulation session by transmitting a session initiation request to server 120 (block 400, FIG. 4A). In one embodiment, the user of a client entity 110 may initiate a session by inputting a uniform resource locator (URL) or other address associated with front-end component 326 into browser 115. In an alternative embodiment, user commands such as an initiate session command may be received at a client entity remote from client entity 110. For example, a remote user may be operating an education session on client entity 110. In this embodiment, user commands may be received at the remote client entity and may be executed at client entity 110.

In response to the user initiating a session, client 110 may receive client engine 316 from graphical modeling server component 125 (block 402). In the AJAX embodiment briefly described above, client engine 316 may be based on several different technologies, such as dynamic hypertext markup language (DHTML), extensible markup language (XML), Java, JavaScript, Flash, etc. Regardless of the underlying technology used to form client engine 316, it should be understood that client engine 316 may provide a dynamic and asynchronous display interface between client entity 110 and front-end component 326.

Some portions of client engine 316 may be cached at client entity 110 from a previous session, in which case these portions may not need to be re-downloaded from server 120. In some embodiments, the programming code that makes up client engine 316 may be implemented in a modular manner. In this situation, portions of client engine 316 may be transmitted to client 110 on an as demand basis as the functionality of those portions of client engine 316 are needed by client 110. For example, client engine 316 may implement a number of "core" functions, such as basic user interaction and display functions, that are always transmitted to client 110. Examples of core functions may include user interface element display (e.g., buttons, backgrounds, effects, etc.). Other functions, such as the display of specific graphical model views, may be transmitted to client entity 110 upon request.

Because client engine 316 can be transmitted to client entity 110 as needed by client entity 110, the graphical presentation and manipulation application may be an entirely web-based application in which client entity 110 does not need to pre-install any portion of client engine 316 other than the portion included within browser 115. In some embodiments, additional software, such as a Java Virtual Machine (JVM), may be used in conjunction with browser 115 to execute client engine 316. Advantageously, a user may typically be able to use the graphical presentation and manipulation application from virtually any computing device that includes a compatible browser 115 and that is connected to network 140.

Client engine 316, once loaded at client entity 110, may present, via user interface 317, an interactive environment for presenting and manipulating a 3D model (block 404). This interactive environment is the data object that the graphical presentation and manipulation application presents to the user in browser 115. In one embodiment, users may interface with the interactive environment to retrieve, view, and manipulate views of a 3D model.

Figure 5:
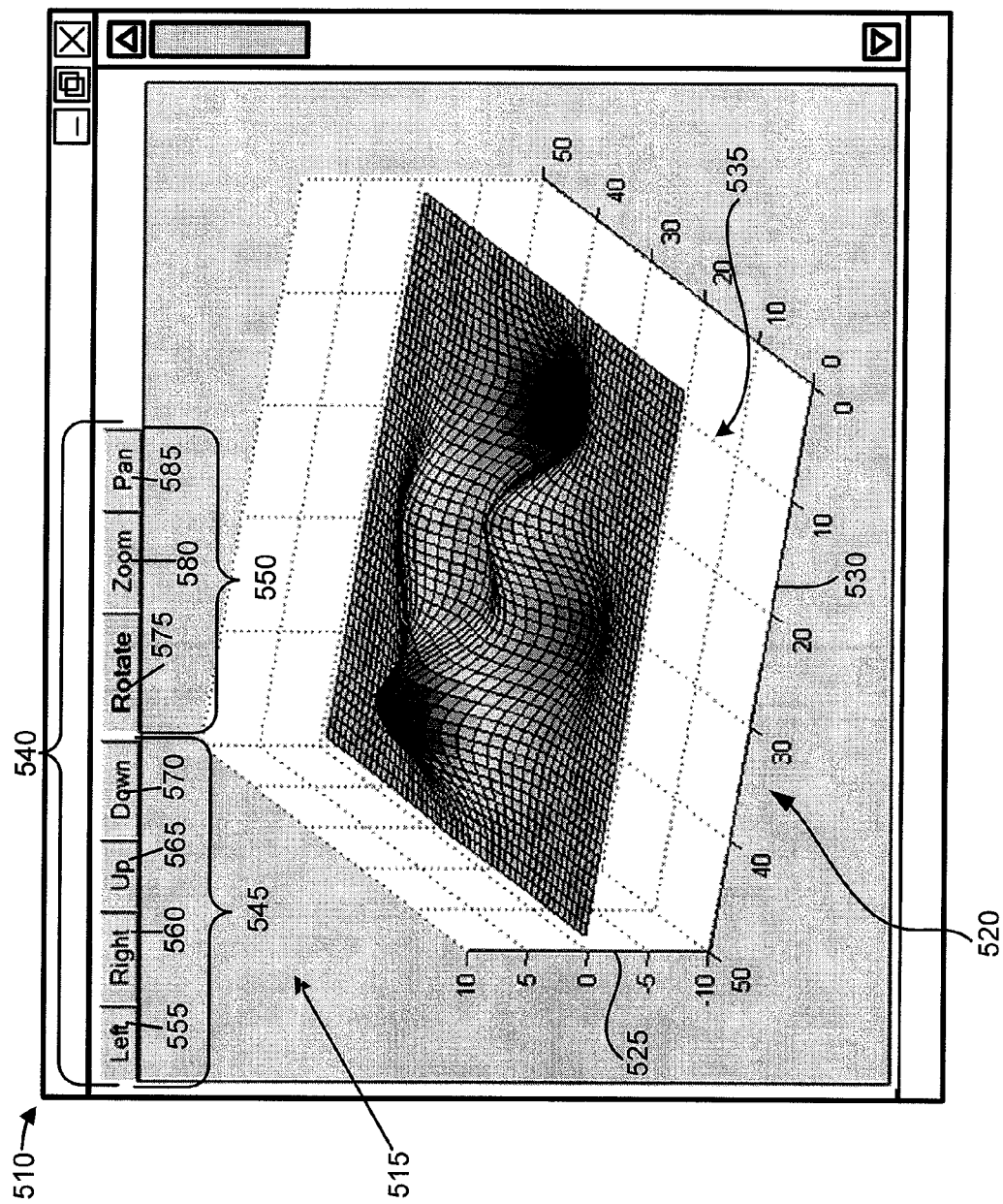
FIG. 5 is a diagram illustrating an exemplary interactive environment that may be presented to a user during a graphical presentation and manipulation session.

FIG. 5 is a diagram illustrating an exemplary interactive environment 510 that may be presented to a user via interface 317. Browser 115 may display the interactive environment 510 based on data received from client engine 316. Exemplary data may include HTML, DHTML, CSS, Java, JavaScript, Flash or XML data. Interactive environment 510 may include a model space 515 for presenting a selected two-dimensional view 520 of a 3D model and further including reference elements 525, and 530 (e.g., axes), and gridlines 535 for providing a frame of reference to selected view 520. Interactive environment 510 may further include a number of control elements (generally referred to as control elements 540) for facilitating modification or manipulation of model view 520 presented in model space 515.

In one embodiment consistent with exemplary embodiments described herein, control elements 540 may include direction buttons 545 and manipulation mode buttons 550. Exemplary direction buttons 545 may include a left button 555, a right button 560, an up button 565, a down button 570, while exemplary manipulation mode buttons 550 may include a rotate mode button 575, a zoom mode button 580, and a pan mode button 585. Details regarding the effect of selection of any of control elements 540 will be described in additional detail below.

Returning to FIG. 4A, client engine 316 may receive a selection from one of user control elements 540 (block 406). As noted above, control element options include direction buttons 545, rotate mode button 575, zoom mode button 580, and pan mode button 585. In particular, receipt of a selection corresponding to any one of direction buttons 545 may indicate that the user wishes to view the displayed model in a same plane, but shifted by a predetermined amount either up, down, left, or right with respect to the current view 520. Selection of one of control elements 540 may be performed in any suitable manner, such as clicking with a mouse, or selecting via keyboard or other input device (e.g., touchscreen, pen, etc.). In one embodiment, the image shift may be on the order of 10 degrees rotation, 16 pixels translation, or scaling to a factor of 5% of the total image dimensions.

In response to the selection of one of direction buttons 545, client engine 316 may determine whether a view corresponding to the selected view 520 has been previously cached on client entity 110 (e.g., in one or memories 230, 240, or 250) (block 408). As will be described in additional detail below, the frequency and content of model views that may be cached or stored on client entity 110 may be based on several factors including, but not limited to, previous viewings, predicted viewings, and a speed of network 140.

When it is determined that a view corresponding to the selected shifted view has been previously cached on client entity 110, the cached view may be retrieved into environment 510 and displayed in browser 115 (block 410). However, when it is determined that a view corresponding to the selected view has not been previously cached on client entity 110, client engine 316 may request the selected view from front-end component 326 on server 120 (block 412).

In one embodiment consistent with exemplary embodiments described herein, front-end component 326, upon receipt of a view request from client entity 110, may initially determine whether a view corresponding to the selected view is cached within front-end component 326 (block 414). If so, front-end component 326 may transmit the selected view to client engine 316 (block 416). Processing may then continue to block 410 described above, where the received view may be displayed in environment 510. However, if a view corresponding to the selected view is not cached within front-end component 326, front-end component 326 may request the view from back-end component 327 (block 418).

In one exemplary embodiment, client engine 316 may perform processing or enhancement on the received view prior to display in interactive environment 510. For example, client engine 316 may perform interpolation, image smoothing, etc., to improve an appearance of the received view. The processing may be based on user input or remote inputs (e.g., from a network device). More specifically, it may be determined that available bandwidth is less than optimal. In this event, image processing/enhancement operations may be performed to avoid having to request additional or higher resolution images from server 120. In one embodiment, the image processing/enhancement may be performed on an additional network device. Alternatively, the image processing/enhancement may be shared with another client entity 110.

Back-end component 327 may extract a 2D view corresponding to the selected view from the 3D model (block 420) and may transfer the extracted 2D view to the front end component 326 for relay to client engine 316 (block 422). The process may continue to block 416, where the selected 2D view may be transmitted from front-end component 326 to client engine 316. Optionally, the extracted 2D view may be cached at front-end component 326 to enhance responsiveness of server 120 in responding to subsequent requests for the selected view from this or another client entity 110.

Returning to block 406, client engine 316 may receive a user selection of rotate mode button 575. Upon receipt of a selection of rotate mode button 575, client engine 316 may place interactive environment 510 into a rotation mode (block 424, FIG. 4B). In one exemplary embodiment, interactive environment 510's rotation mode may provide for virtual manipulation of the displayed model in response to user input such as mouse movements, keyboard input, or other suitable input device. For example, upon entry into rotation mode, users may click and drag on the model view to indicate the degree and extent to which they wish to rotate the model about either a horizontal axis or a vertical axis. In one embodiment, each pixel of mouse movement may correspond to approximately 0.5 degrees of rotation.

In accordance with the exemplary embodiments described herein, responsiveness of graphical presentation and manipulation application may be substantially enhanced by providing for the asynchronous retrieval and display of 2D model views, rather than an entire 3D visualization of the model. More specifically, upon receiving a user request to view a selected 3D model at front-end component 326, back-end component 327 may generate or open the selected model. Front-end component 326 may then extract or retrieve a 2D view representing the selected view and relay or transmit the 2D view to client entity 110.

In one exemplary embodiment, the 2D views may take the form of compressed image files, such as gif, jpeg, bmp, or png files, although any suitable graphic format may be used. In addition to compressed image formats, various other image formats, such as vector graphics formats (e.g., VML, SVG, etc.) may be used in accordance with the embodiments described herein.

In one embodiment, each 2D view may include multiple related image files, such that portions of the 2D view may be received and displayed prior to other portions of the 2D view. Additionally, each 2D view received from front-end component 326 may include data sufficient to enable client engine 316 to reconstruct an entirety of the selected 2D view. Alternatively, view data transmitted from server 120 to client 110 may include only changed view data, thereby reducing bandwidth requirements necessary to display the desired 2D view.

In relation to block 416 described above, retrieval of the selected shifted view from front-end component 326 on server 120 may include retrieval of additional ones of the multiple related image files associated with the selected shifted view. For example, upon selection of left button 555, client engine 316 may determine whether multiple image files associated with a left-shifted view of the model (e.g., shifted by approximately 1 inch or 120 pixels) have been cached and, if not, client engine 316 may request the multiple image files associated with a left-shifted view of the model from front-end component 326.

Returning to FIG. 4B, upon entry into rotation mode, client engine 316 may receive or observe input from input device 260 corresponding to a user's desired rotation of the displayed view (block 426). In response to the observed input, client engine 316 may provide a visual object representing observed movement of input device 260 corresponding to a desired change in rotation angle(s) about a horizontal axis, a vertical axis, or a combination of both the horizontal and vertical axes (block 428). In one embodiment, the visual object may include a virtual 3D object such as a cube or other polygon shape overlaid over the previously viewed 2D visualization.

Figure 6:
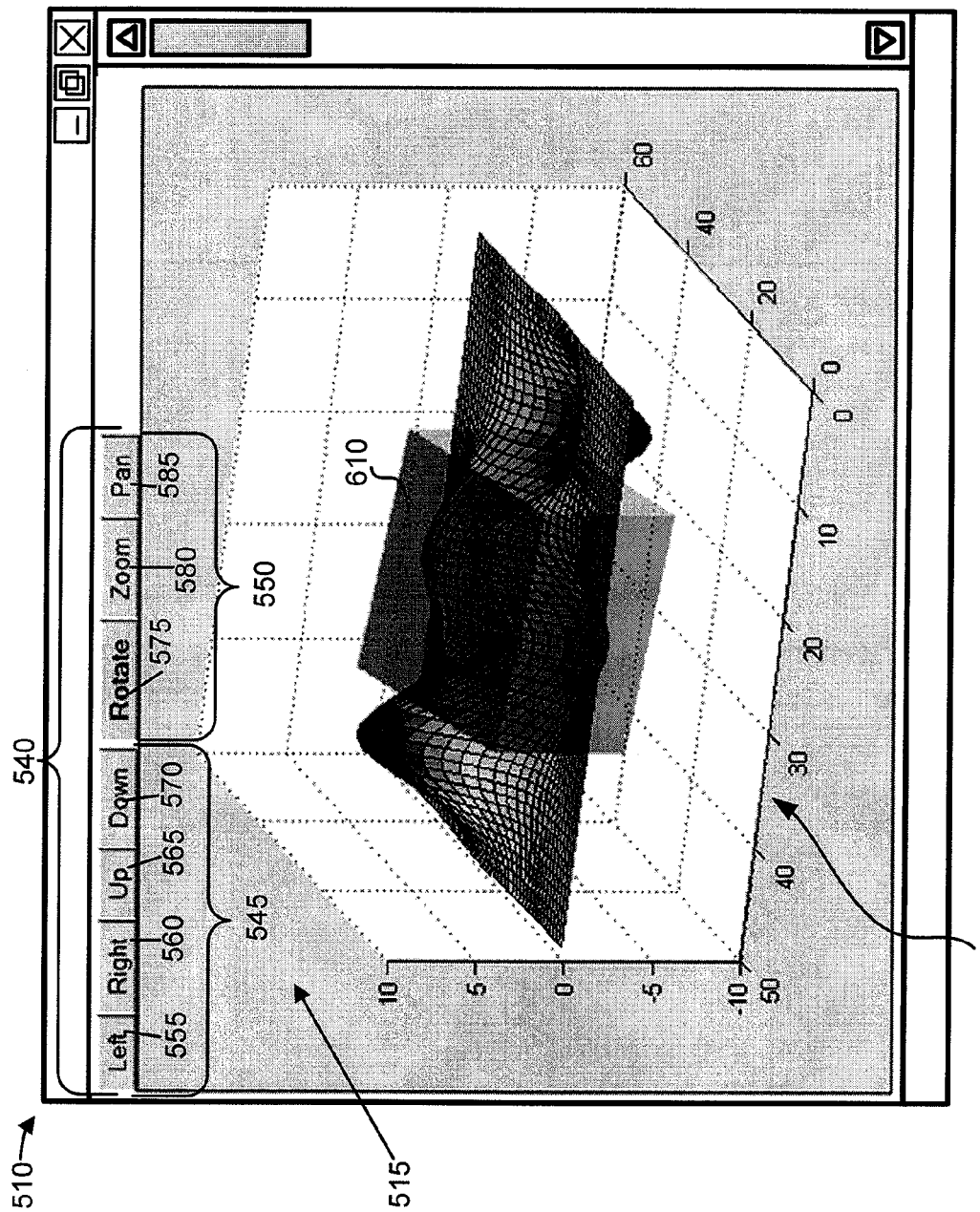
FIG. 6 is a diagram illustrating an another exemplary interactive environment that may be presented to a user while in a rotation mode.

FIG. 6 is a diagram illustrating one exemplary visual object 610 presented in interactive environment 510 while in rotation mode. As shown, in one exemplary embodiment, visual object 610 may be represented as a virtual three-dimensional polygon that appears to rotate in response to user input via input device 260. In the illustrated embodiment, the virtual three-dimensional polygon is a cube, however, any suitable shape may be used that assists a user in accurately identifying a desired view or orientation. As described, above, visual object 610 may appear upon initial entry into rotation mode. Alternatively, visual object 610 may appear when client engine 316 observes input from input device 260.

Returning to FIG. 4B, client engine 316 may receive a selection of a desired view for display (block 430). In one embodiment, receiving a selection of a desired display view may correspond to a rotated view of the visual object (such as, visual object 610). In this embodiment, a cessation of movement, or a click release of input device 260 may signify that the user has settled on or otherwise selected a view corresponding to the current position of the visual object. In an alternative embodiment, observation of a desired view selection may correspond to user input, such as a specific angle or angles of view.

Once a selected view has been received, client engine 316 may proceed to block 408 (described above) where it is determined whether a view (or discrete portions or elements of a view) corresponding to the selected view has been previously cached on client entity 110. As described briefly above, the frequency and content of model views or view elements that may be cached or stored on client entity 110 may be based on several factors including, but not limited to, previous viewings, predicted viewings, and speed or latency of network 140.

Returning to block 406 (FIG. 4A), client engine 316 may receive a user selection of zoom mode button 580. Upon receipt of a selection of zoom mode button 580, client engine 316 may place interactive environment 510 into a zoom mode (block 432, FIG. 4C). In one exemplary embodiment, interactive environment 510's zoom mode may provide for rapid scaling of a displayed view in response to user input, such as mouse movements, keyboard input, or other suitable input device. For example, upon entry into zoom mode, users may click and drag on the model view to indicate the degree and extent to which they wish to zoom in or out of the currently presented view. In one exemplary embodiment, a left click may correspond to a zoom-in command, while a right click may correspond to a zoom-out command. Alternatively, keyboard input may control the zoom feature. In still another embodiment, input from a mouse scroll wheel may be used to control the zoom feature. In one embodiment, each click of the input device, or each click in the scroll wheel may corresponding to a 2× change in magnification of the presented view.

Returning to FIG. 4C, upon entry into zoom mode, client engine 316 may receive or observe input from input device 260 corresponding to a user's desired zoom level and view center point (block 434). In response to the observed input, client engine 316 may initially determine whether a view corresponding to the selected zoom and center point level has been previously cached at client entity 110 (block 436). If so, the cached view is retrieved (block 438) and displayed in interactive environment 510 (block 440).

If a cached view corresponding to the selected zoom level and center point has not been previously stored, client engine 316 may scale (e.g., pixel scale) at least a portion of the image or images currently being presented to correspond to the desired zoom level (block 442). Although rapid scaling of the previously presented view image or images may result in a less than optimal viewing experience, it may present users with a substantially instantaneous representation of the selected zoom level. Substantially simultaneously, client engine 316 may request an optimal or full resolution view corresponding to the selected zoom level and center point from front-end component 326 (block 444). The process may then proceed to block 414 (FIG. 4A) described above for retrieval of a corresponding view from server 120.

Figure 7B:
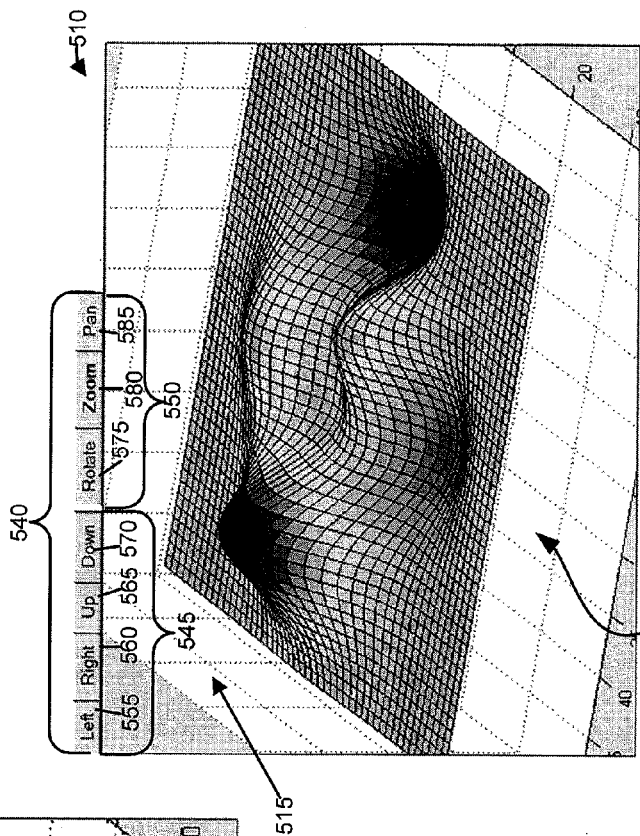
FIGS. 7A and 7B are diagrams illustrating exemplary interactive environment displays during several portions of a zoom mode.
Figure 7A:
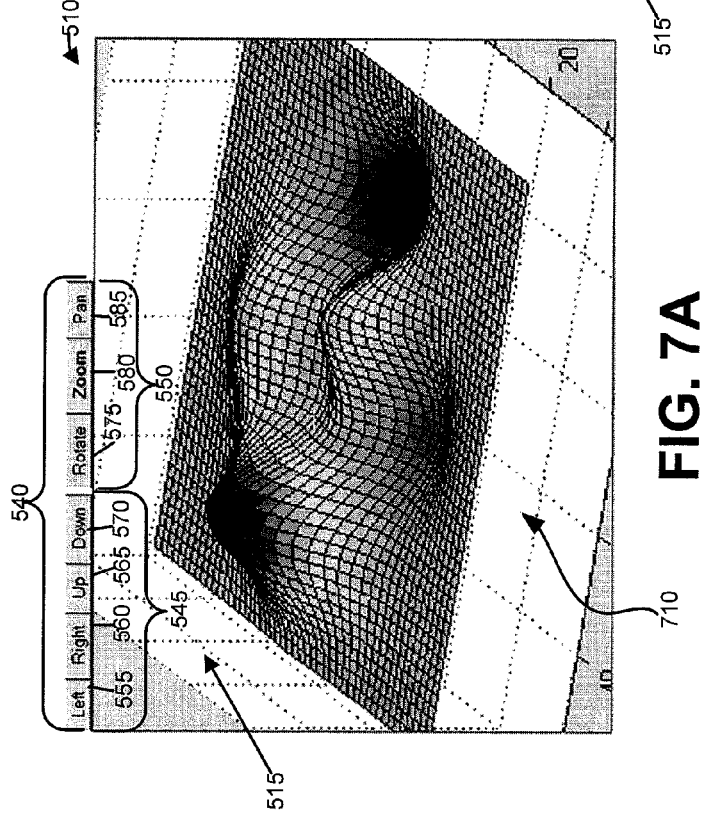

FIGS. 7A and 7B are diagrams illustrating one exemplary embodiment of a view 710 displayed within interactive environment 510 while in zoom mode. As shown, view 710 in FIG. 7A may be presented as a scaled-up version of a previously displayed view. For example, an initial view corresponding to view 710 may have been presented in a resolution of 200×150 pixels. In response to observed user input, client engine 316 may have scaled the initial 200×150 view to display as 400×300 pixel view 710. Display of scaled view 710 may be provided while client engine 316 retrieves a full resolution view corresponding to the desired zoom level from server 120.

Following retrieval of a full resolution view image or images corresponding to the selected zoom level and center point, view 720 of FIG. 7B may be presented within interactive environment. Unlike view 710, the 200×150 pixel resolution of view 720 is not a scaled resolution.

Returning to block 406 (FIG. 4A), client engine 316 may receive a user selection of pan mode button 585. Upon receipt of a selection of pan mode button 585, client engine 316 may place interactive environment 510 into a pan mode (block 446, FIG. 4D). In one exemplary embodiment, interactive environment 510's pan mode may provide for repositioning of view 520 in response to user input such as mouse movements, keyboard input, or other suitable input. For example, upon entry into zoom mode, users may click and drag on view 520 to reposition view 520 within interactive environment 510. In some instances, such movement may cause portions of view 520 not previously visible within environment 510 to become visible within environment 510.

Figure 8:
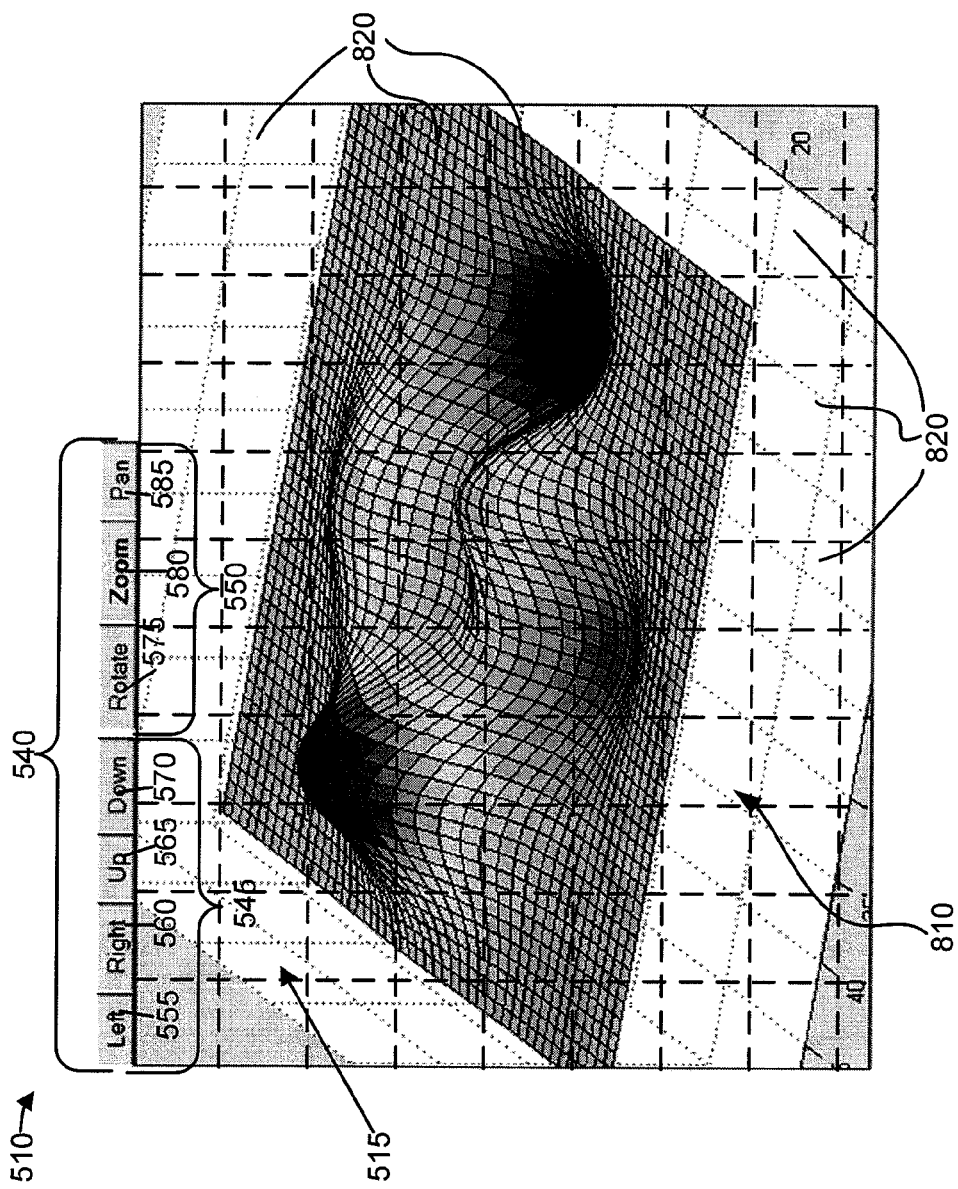
FIG. 8 is a diagram illustrating an exemplary interactive viewing environment where the view presented is made up of a number of sub-images.

As described above, in one embodiment, each displayed view may include of a number of sub-images. FIG. 8 is a diagram illustrating one embodiment of environment 510 for displaying a view 810 made up of a number of sub-images 820. To assist in facilitating an understanding of this concept, each sub-image boundary is designated by a dashed line in FIG. 8. It should be understood that this dashed line is for explanatory purposes only and that the portion of view 810 provided on each sub-image 820 would typically flow seamlessly into neighboring sub-images 820. To respond to user view requests as efficiently as possible, client engine 316 may request only those view sub-images 820 corresponding to the portion of view 810 visible within environment 510. Consequently, view sub-images 820 outside of environment 510 may not be initially retrieved at the time of view display or rendering. For example, following a zoom request, view sub-images corresponding to only a central portion of view 520 may be retrieved from server 120.

Client engine 316 may receive a pan request based on input from input device 260 (block 448). Client engine 316 may initially determine whether view 810 or view sub-images 820 corresponding to the selected view 810 have been previously cached on client entity 110 (e.g., in one of memories 230, 240, or 250) (block 450). As will be described in additional detail below, the frequency and content of model views or view sub-images that may be cached or stored on client entity 110 may be based on several factors including, but not limited to, previous viewings, predicted viewings, processing capabilities of client entity 110, and speed of network 140.

When it is determined that view sub-images 820 corresponding to the newly visible sub-images in shifted view 810 have been previously cached on client entity 110, the cached sub-images may be retrieved into environment 510 (block 452) and displayed in browser 115 (block 454). However, when it is determined that a shifted view or view sub-images 820 corresponding to the selected shifted view 810 have not been previously cached on client entity 110, client engine 316 may request the selected view sub-images 820 from server 120 in the manner described in detail above (block 456). Processing may then proceed to block 414 (FIG. 4A) described above for retrieval of a corresponding view from server 120. It should be noted that in instances where entire views 810 are retrieved from server 120 rather than view sub-images 820, determination of cached view data may be unnecessary, since entire view 810 is available to client engine 316, regardless of the portion of view 810 displayed in environment 510 at any specific time.

Exemplary Optimizations

Figure 9:
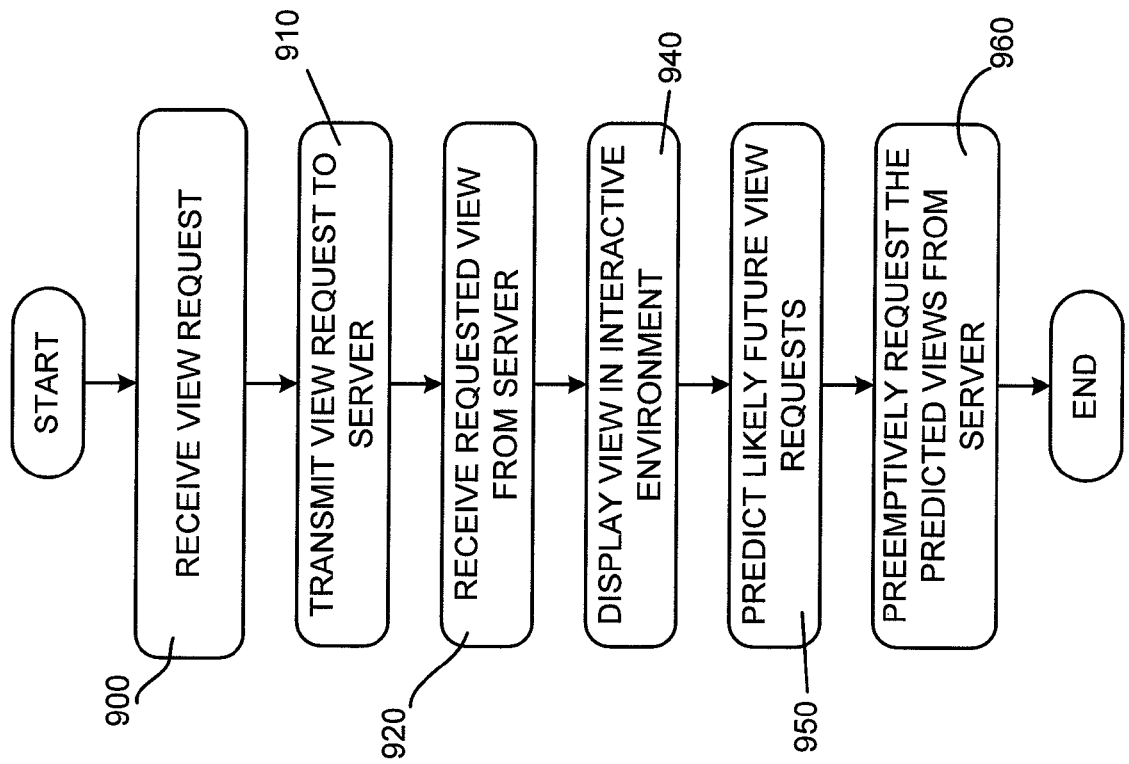
FIG. 9 is a flow chart illustrating exemplary processing performed by a client engine in assisting a client in adaptively enhancing a user experience of the graphical presentation and manipulation application.

FIG. 9 is a flow chart illustrating exemplary processing performed by client engine 316 to assist client entity 110 in adaptively enhancing a user experience of the graphical presentation and manipulation application. Processing may begin with client engine 316 receiving an initial user request to display a view 520 in interactive environment 510 (block 900). In the manner described above with respect to FIG. 4, client engine 316 may request a corresponding view image (or combination of sub-images) from server 120 (block 910). Client engine 316 may receive the corresponding view image from server 120 (block 920) and display the received view image in interactive environment 510 (block 930).

In addition to requesting specific, user-requested views from server 120, client engine 316 may also predict likely future view requests (block 940) and may preemptively request view images corresponding to the predicted view requests from server 120 prior to receiving requests for these views from the user (block 950).

In one exemplary embodiment described herein, client engine 316 may predict likely future view requests based on the user's historical viewing behaviors. For example, a user of client entity 110 or graphical presentation and manipulation application may typically request a 30° isometric view and a plan view for opened models. This determination may be made based on an analysis of previous model view requests. In this example, based upon the user's historical preferences, client engine 316 may identify these preferences and may preemptively request and receive views corresponding to the historically requested views, such that subsequent user requests will be addressed more quickly and efficiently.

Consistent with the embodiments described herein, predicted view requests may be based, at least in part, on a type of model or underlying data being analyzed or displayed. For example, a displayed model view corresponding to an aerodynamic structure may result in different predicted view requests, than a model view corresponding to flow characteristics of a water treatment facility. In one implementation, client engine 316 may predict future likely view requests based on the type of model being displayed.

Alternatively, view request predictions may be made based on a database or collection of historical view requests, either collectively across a number of models, or specifically for each available model. In this embodiment, a larger corpus of data may be used to identify trends and to assist in predicting possible view requests for a selected model.

In yet another exemplary embodiment, view request predictions may be made based, at least in part, on stored mappings of input device (e.g., mouse) movements. For example, it may be determined that observing a mouse movement in a vertical direction towards a top portion of a displayed view, while in the rotation mode, may be a precursor of a user request for a down-rotated view. Similarly, it may be determined that observing a mouse movement in a horizontal direction towards a right-hand portion of a displayed view, while in the rotation mode, may be a precursor of a user request for a clockwise-rotated view. Using stored mappings reflective of these preferences, client engine 316 may preemptively request one or more views corresponding to the predicted view requests. As described above with respect to historical view requests, input device movement mappings may be maintained locally with respect to a given user, or may be based on prior input device movements relating to a number of system users. In a collective example, the input device movement mappings may be initially maintained on server 120 and may be transmitted to client engine 316 upon execution of the graphical presentation and manipulation application.

In an ideal environment, the graphical presentation and manipulation application may be executed by an adequately powered client entity 110 on a high-speed, high reliability network 140. Such an environment may provide large amounts of network bandwidth and client entity processing capabilities. In this environment, client engine 316 may identify, request, and receive a number of preemptive view images, thereby minimizing the time taken to display a larger number of possible views.

However, in some instances, network 140 may have lower than optimal bandwidth and/or client entity 110 may have lower than optimal processing capabilities. In these circumstances, client engine 316 may be limited in the amount of processing it may preemptively perform or the number of view images it may preemptively request and receive. For example, client entity 110 may lack sufficient processing capabilities to simultaneously predict likely view requests based on both input device mappings and historical usage patterns.

In one exemplary embodiment, client engine 316 may be configured to adaptively identify view images likely to be requested based on available processing capabilities. For example, if a processor associated with client entity 110 is operating at greater than 90% capacity, view prediction by client engine 316 may be suspended. Alternatively, view prediction by client engine 316 may be restricted to only a single criteria, such as local historical viewing patterns.

Alternatively, client engine 316 may monitor bandwidth and/or latency of network 140. Based on the monitored bandwidth and/or latency, client engine 316 may limit or modify a number or frequency of preemptive view image requests. In this manner, client engine 316 may be adaptively configured to provide an optimal user experience based on the available computing environment.

In another exemplary embodiment described herein, front-end component 326 may be configured to perform similar predictive processing as client engine 316. In this embodiment, client engine 316 may periodically transmit client-side information, such as input device movement mappings and historical view request information to front-end component 326. Front-end component 326 may then identify or predict likely view requests in a manner similar to client engine 316. Front-end component 326 may then retrieve or request view images corresponding to the likely view requests from back-end component 327 in advance of request receipt from client engine 316. By providing prediction at both the client and server sides, a user experience may be most completely optimized.

The above-described functions and operations that are performed by the graphical presentation and manipulation application are exemplary. Through interactive environment 510, the graphical presentation and manipulation application may permit a user to perform numerous additional operations, such as modification of model attributes (e.g., color, texture, etc.), saving or exporting of model views, etc.

In one embodiment, client engine 316 may handle most or all of the functionality associated with responding to user actions relating to navigating and/or presenting environment 510 without needing to contact server 120. Other functions of the graphical presentation and manipulation application, such as the rendering or extraction of two-dimensional views from three-dimensional models, may be handled by logic in server 120. By handling formatting and user actions locally at client entity 110, the graphical presentation and manipulation application can provide a high level of responsiveness to user actions that tend to occur frequently and for which users expect immediate feedback.

In alternative embodiments, the division of functions executed at client engine 316, front-end component 326, and back-end component 327 may be modified such that client engine 316 handles more or fewer functions and similarly, front-end component 326 and back-end component 327 may also handle more or fewer functions. In one exemplary embodiment, a client entity 110 having reduced memory and/or processing capabilities may be connected to an additional network device capable of sharing memory and/or processing resources with client 110. Such a network device may be operatively connected to client device 110 via a LAN or other network environment. In an extension of this embodiment, client entity 110 may use a memory on the network device to cache or maintain previously received or predictively received views from server 120.

In another exemplary embodiment, server 120 may be configured as a technical computing environment (TCE) that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language such as C++, C, Fortran, Pascal, etc.

In one embodiment, the server-based TCE may include a dynamically typed language that can be used to express problems and/or solutions in mathematical notations familiar to those of skill in the relevant arts. For example, the server-based TCE may use an array as a basic element, where the array may not require dimensioning. In addition, the server TCE may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and design, state based analysis and design, etc.

The server-based TCE may further provide mathematical functions and/or graphical tools (e.g., for creating plots, surfaces, images, volumetric representations, etc.). In one embodiment, the server-based TCE may provide these functions and/or tools using toolboxes (e.g., toolboxes for signal processing, image processing, data plotting, distributed processing, etc.). In another embodiment, the server-based TCE may provide these functions as block sets. In still another embodiment, the server-based TCE may provide these functions in another way, such as via a library, etc. The server-based TCE may be implemented as a text based environment, a graphically based environment, or another type of environment, such as a hybrid environment that is both text and graphically based.

In another alternative embodiment, the server-based TCE may be implemented using one or more text-based products. For example, a text-based the server-based TCE, may be implemented using products such as, but not limited to, MATLAB® by The MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim. The text-based TCE may support one or more commands that support code generation, constraints generation, constraints checking, etc.

In another alternative embodiment, the server-based TCE may be implemented as a graphically-based TCE using products such as, but not limited to, Simulink®, Stateflow®, SimEvent™, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; System VIEW from Elanix, Vision Program Manager from PPT Vision, Khoros from Khoral Research, Gedae by Gedae, Inc.; Scicos from (INRIA); Virtuoso from Cadence, Rational Rose from IBM, Rhopsody or Tau from Telelogic; or aspects of a Unified Modeling Language (UML) or SysML environment. The graphically-based TCE may support code generation, constraints generation, constraints checking, etc.

In another alternative embodiment, a language that is compatible with a product that includes a server-based TCE, such as one or more of the above identified text-based or graphically-based TCE's, may be used. For example, MATLAB (a text-based TCE) may use a first command to represent an array of data and a second command to transpose the array. Another TCE may be MATLAB-compatible and may be able to use the array command, the array transpose command, or other MATLAB commands. For example, the language may use the MATLAB commands to perform distributed processing.

In another alternative embodiment, the server-based TCE may be implemented in a hybrid TCE that combines features of a text-based and graphically-based TCE. In one embodiment, one TCE may operate on top of the other TCE. For example, a text-based TCE (e.g., MATLAB) may operate as a foundation and a graphically-based TCE (e.g., Simulink) may operate on top of MATLAB and may take advantage of text-based features (e.g., commands) to provide a user with a graphical user interface and graphical outputs (e.g., graphical displays for data, dashboards to monitor commands and status, etc.)

CONCLUSION

A client/server-based graphical presentation and manipulation application is described herein that executes in a distributed manner over a network. The networked graphical presentation and manipulation application can generally be used without requiring a user to install any specific software prior to using the application.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, in some embodiments, server 120 may provide one or more application programming interfaces (APIs) that allow different content providers to integrate elements of the graphical presentation and manipulation application into their thin client applications or web sites.

Moreover, while series of acts have been described with regard to FIGS. 4A-4D and 9, the order of the acts may be varied in other embodiments consistent with the invention. Moreover, non-dependent acts may be implemented in parallel.

Aspects of the invention, as described above, may be implemented in many different forms of software, firmware, and hardware in the exemplary embodiments illustrated in the figures. The actual software code or specialized control hardware used to implement aspects consistent with the exemplary embodiments is not limiting of the invention. Thus, the operation and behavior of the exemplary embodiments of the invention were described without reference to the specific software code—it being understood that one would be able to design software and control hardware to implement the described embodiments based on the description herein.

Further, certain portions of the invention may be implemented as "logic" or a "component" that performs one or more functions. This logic may include hardware, such as an application specific integrated circuit or a field programmable gate array, software, or a combination of hardware and software.

No element, block, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A computing device-implemented method, comprising:
   receiving code from a server;
   generating a local environment based on the code, wherein the local environment is configured to display a view of a graphical model;
   predicting, based on a type of model being displayed, one or more model views likely to be requested; and
   storing the predicted views in a memory for display in the local environment.

2. The method of claim 1, wherein predicting one or more model views further comprises:
   storing past user view request information; and
   identifying likely future view requests based on the stored past user view request information.

3. The method of claim 2, wherein the past user view request information comprises past user view request information for a user of the local environment.

4. The method of claim 2, wherein the past user view request information comprises past user view request information for a number of distributed users having access to the server.

5. The method of claim 2, wherein the past user view request information comprises past user view request information for a number of different models.

6. The method of claim 1, wherein predicting one or more model views further comprises:
   predicting likely view requests based on stored input device movement mappings.

7. The method of claim 6, wherein the stored input device movement mappings identify a pattern of likely view requests based on a corresponding pattern of input device movements.

8. The method of claim 6, wherein the stored input device movement mappings are locally maintained for a local user.

9. The method of claim 6, wherein the stored input device movement mappings are maintained on the server for a number of distributed users.

10. The method of claim 1, further comprising:
    determining processing capabilities of a client engine associated with the local environment; and
    predicting one or more model views based on available processing capabilities of the client engine when it is determined that the processing capabilities of the client engine exceed a predetermined capacity.

11. The method of claim 1, further comprising:
    predicting the one or more model views at a client engine associated with the local environment;
    transmitting requests for the predicted one or more model views to the server;
    receiving the predicted one or more model views; and
    storing the received predicted one or more model views in a memory associated with the client engine.

12. The method of claim 1, further comprising:
predicting the one or more model views at the server;
transmitting the predicted one or more model views to a client engine associated with the local environment; and
storing the received predicted one or more model views in a memory associated with the client engine.

13. The method of claim 1, further comprising:
receiving a request to manipulate the view within the local environment;
determining whether the requested view has been previously stored as one of the one or more predicted model views;
retrieving the requested view from the memory; and
displaying the requested view in the local environment.

14. A non-transitory computer-readable medium that stores instructions executable by at least one processor, the computer-readable medium comprising:
one or more instructions for generating a local environment in a client engine, wherein the local environment is configured to display a two dimensional view of a graphical model;
one or more instructions for predicting model views likely to be requested;
one or more instructions for storing the predicted model views in a memory for display in the local environment;
one or more instructions for receiving a request to display a manipulated view;
one or more instructions for determining whether the requested manipulated view has been previously stored as a predicted view;
one or more instructions for retrieving the predicted view matching the requested manipulated view from the memory; and
one or more instructions for displaying the predicted view matching the requested manipulated view in the local environment.

15. The computer-readable medium of claim 14, further comprising:
one or more instructions for determining a processing capacity of the client engine; and
one or more instructions for predicting model views likely to be requested when the processing capacity meets or exceeds a predetermined threshold.

16. The computer-readable medium of claim 14, wherein the one or more one or more instructions for predicting model views likely to be requested further comprise:
one or more instructions for storing past user view request information; and
one or more instructions for identifying likely future view requests based on the stored past user view request information.

17. The computer-readable medium of claim 14, wherein the one or more one or more instructions for predicting model views likely to be requested further comprise:
one or more instructions for predicting likely view requests based on stored input device movement mappings.

18. The computer-readable medium of claim 17, wherein the stored input device movement mappings identify a pattern of likely view requests based on a corresponding pattern of input device movements.

19. A system comprising:
client logic executing within a browser program of a client computing device, the client logic including a user interface component capable of displaying model views on the client computing device and a client engine component capable of handling requests from a user to manipulate spatial positioning of a model view on the client computing device,
wherein the client logic is configured to predict model views likely to be requested based on a type of model being displayed; and
server logic configured to distribute the client engine to the client computing device when requested through the browser program of the client computing device, the server logic including a back-end server component configured to extract requested two-dimensional views from corresponding three-dimensional models, and a front-end server component configured to provide a web interface to the client computing device and to forward the extracted views to the client computing device,
wherein the server logic is further configured to receive requests from the client logic for model views corresponding to the predicted model views, extract the requested model views, and transmit the requested model views to the client logic.

20. The system of claim 19, wherein the client logic is configured to determine a processing capacity of the client computing device and predict the model views likely to be requested when the processing capacity meets or exceeds a predetermined threshold.

21. The system of claim 19, wherein the client logic is configured to further predict model views likely to be requested based on one of historical model view requests or stored input device movement mappings.

* * * * *